United States Patent [19]

Kashima et al.

[11] Patent Number: 4,468,471
[45] Date of Patent: Aug. 28, 1984

[54] COMPOSITION FOR CERAMIC DIELECTRICS

[75] Inventors: Masao Kashima; Yasuo Miyashita, both of Saitama, Japan

[73] Assignee: Mitsubishi Mining & Cement Company, Ltd., Tokyo, Japan

[21] Appl. No.: 471,804

[22] Filed: Mar. 3, 1983

[30] Foreign Application Priority Data

Mar. 15, 1982 [JP] Japan .................. 57-40396

[51] Int. Cl.$^3$ ............................................. C04B 35/49
[52] U.S. Cl. ................................... 501/135; 501/136; 501/152
[58] Field of Search .................. 501/135, 136, 152; 361/321

[56] References Cited

U.S. PATENT DOCUMENTS 3,431,124  3/1969  Hayashi et al. .................... 501/136

FOREIGN PATENT DOCUMENTS 50-58600  5/1975  Japan .................................. 501/136

OTHER PUBLICATIONS

Okazaki, K.-*Ceramic Engineering for Dielectrics* (Rev. ed), 1978, pp. 276-280.

Primary Examiner—Helen M. McCarthy
Attorney, Agent, or Firm—Edward J. Brenner

[57] ABSTRACT

A temperature compensating composition for ceramic dielectrics comprising $La_2O_3$—$TiO_2$—$CaO$—$MgO$ based composite as a main component and $ZrO_2$ as an additive respectively sintered. As the composition is very fine in grain size, it is a very suitable raw material for such a product as a layer-built capacitor which is used in a high electric field.

1 Claim, No Drawings

COMPOSITION FOR CERAMIC DIELECTRICS

BACKGROUND OF THE INVENTION

The present invention relates to a temperature compensating composition for ceramic dielectrics which has a high breakdown voltage and prolonged life.

Conventionally, as a temperature compensating composition for ceramic dielectrics, there has been publicly known a $La_2O_3$-$TiO_2$-$CaO$-$MgO$ based composite which comprises 3.0–25.0 mol % $La_2O_3$, 51.0–62.0 mol % $TiO_2$, 0.5–45.0 mol % CaO and 1.0–45.0 mol % MgO at the conversion of oxides of lanthanum, titanium, calcium and magnesium to respectively $La_2O_3$, $TiO_2$, CaO and MgO. However, the grain size thereof is more than 5 μm, consequently it is unsuitable for a raw material of such a product as a layer-built capacitor which is used in a high electric field. Namely, in the case where the grain size is large, an electric field strength falling on one grain thereof becomes larger and consequently a breakdown voltage becomes lower and a life becomes shorter, resulting in a lowering of reliability. Further, as it contains $La_2O_3$, use of alumina setter is required. Therefore, use properly of the alunina setter and zirconia setter which is used in an usual composition for ceramic dielectrics is required, thereby making the manufacturing process more complex. The present invention has been devised by overcoming the above mentioned defects of the conventional compositions.

BRIEF SUMMARY OF THE INVENTION

The primary object of the present invention is to provide a composition for ceramic dielectrics which is very fine in grain size, not more than 5 μm.

The secondary object of the present invention is to provide a composition for ceramic dielectrics which has a prolonged life.

The other object of the present invention is to provide a composition for ceramic dielectrics which has a high breakdown voltage.

The still other object of the present invention is to provide a composition for ceramic dielectric which is able to be sintered with zirconia setter.

According to the present invention, there is provided a composition for ceramic dielectrics comprising $La_2O_3$-$TiO_2$-$CaO$-$MgO$ based composite consisting of 3.0–25.0 mol % $La_2O_3$, 51.0–62.0 mol % $TiO_2$, 0.5–45.0 mol % CaO and 1.0–45.0 mol % MgO as a main component at the conversion of oxides of lanthanum, titanium, calcium, and magnesium to $La_2O_3$, $TiO_2$, CaO and MgO, and $ZrO_2$ at the conversion of zirconium oxide to $ZrO_2$ as an additive, the amount of said $ZrO_2$ being 0.1–8.0 weight % of said main component.

DETAILED DESCRIPTION OF THE INVENTION

The composition of the present invention, as shown in examples, is very fine in grain size, consequently it is optimum for such a product as a layer-built capacitor which is used in a high electric field. Namely, as the grain size thereof is fine, electric field strength falling on one grain becomes smaller, thereby the breakdown voltage is higher and the life is longer, resulting in an improvement of reliability. Further, the composition of the present invention is sufficiently practical, for the dielectric constant, Q value and temperature characteristics thereof are equivalent to those of the conventional composition which contains no zirconium oxide.

The reason why the composition of the present invention is very fine in grain size is that a liquid phase which is generated in the course of sintering of the raw material compounded corresponding with the composition as described above, makes the sintering temperature lower and suppresses excessive growth of the grain.

In the composition of the present invention, when the amount of $La_2O_3$ is less than 3.0 mol %, the Q value is lower, and when more than 25.0 mol %, the value Q is lower, making the composition commercially impractical. When the amount of $TiO_2$ is less than 51.0 mol %, the sintering becomes difficult, and when more than 62.0 mol %, large grains grow and the deposition thereof to the setter occurs. CaO promotes sintering and is also effective to the negative temperature coefficient. However, when the amount thereof is less than 0.5 mol %, no addition effect is seen, and when more than 45.0 mol %, the grain size becomes larger. When the amount of MgO is less than 1.0 mol %, no addition effect is seen, and when more than 45.0 mol %, huge grains grow.

Zirconium oxide as an additive improves the sintering property of the ceramic and at the same time the Q value thereof. When the amount of $ZrO_2$ is less than 0.1 weight %, the grain becomes not less than 5 μm in size and reacts with zirconia setter, and when more than 8.0 weight %, there are generated the grains of which the size is not less than 5 μm.

The composition of the present invention, for example, can be prepared as follows: the raw material is weighed to correspond to the component of the composition of the present invention after sintering, then to be mixed and pulverized in a wet ball mill. The thus obtained mixture is filtered and dried to be pressed to a form written afterword under pressure and sintered.

As for the main component of the composition of the present invention, $La_2O_3$ and $La_2(C_2O_4)_3 \cdot 9H_2O$ are preferable as lanthanum compound, $TiO_2$ and $Ti_2O_3$ are are preferable as titanium compound, CaO and $CaCO_3$ are preferable as calcium compound, MgO and $MgC_2O_4 \cdot 2H_2O$ are preferable as magnesium compound and $ZrO_2$ and $3ZrO_2 \cdot CO_2 \cdot 6H_2O$ are preferable as zirconium compound.

The present invention will be understood more readily with reference to the following examples. The examples, however, are intended to illustrate the present invention and are not to be construed to limit the scope of the present invention.

EXAMPLE

As raw materials, that is, $La_2O_3$, $TiO_2$, CaO, MgO as a main component and $ZrO_2$ as an additive of respective chemical reagent grade are weighed to correspond with such a compounding ratio thereof after sintering as shown in a following table to be mixed and pulverized in a wet ball mill for 20 hours. The mixed and pulverized mixture is filtered and dried to be pressed under a pressure 3 ton/cm$^2$ to a disc of diameter 16 mm having a thickness 0.6 mm. The obtained discs are sintered for one hour at the sintering temperature as shown in the table and there are thus obtained samples NO. 1-7. The grain size of these samples is observed using an optical microscope at magnification 400. The capacitance value and Q value of these samples are measured by determining the samples having the both surfaces coated with silver electrode under the conditions of 25° C., 1.0 Vrms and 100 KHz using YHP Multi-frequency LCR meter model 4274 A.

layer-built capacitor which is used in a high electric field.

| sample NO. | main component composition ratio (mol %) | | | | $ZrO_2$ amount (wt %) | filing temperature (°C.) | grain size (μm) | electric characteristics | | | reaction with zirconia setter |
|---|---|---|---|---|---|---|---|---|---|---|---|
| | $La_2O_3$ | $TiO_2$ | CaO | MgO | | | | dielectric constant | Q | temperature coefficient (ppm/°C.) | |
| 1 | 24.0 | 58.0 | 2.0 | 16.0 | 0.1 | 1350 | 1-4 | 49.5 | 5300 | +81.2 | none |
| 2 | 3.0 | 51.5 | 0.5 | 45.0 | 0.5 | 1330 | 1-3 | 30.1 | 6100 | −5.1 | " |
| 3 | 25.0 | 59.0 | 5.0 | 11.0 | 1.0 | 1330 | 1-3 | 60.0 | 4500 | −50.9 | " |
| 4 | 3.0 | 62.0 | 2.0 | 33.0 | 2.0 | 1310 | 1-4 | 45.3 | 3300 | −123.0 | " |
| 5 | 13.0 | 57.0 | 26.0 | 4.0 | 4.0 | 1310 | 1-4 | 89.1 | 3100 | −261.7 | " |
| 6 | 6.0 | 53.0 | 39.0 | 2.0 | 6.0 | 1310 | 1-4 | 115.7 | 2800 | −482.4 | " |
| 7 | 3.0 | 51.0 | 45.0 | 1.0 | 8.0 | 1290 | 1-4 | 135.2 | 2300 | −764.5 | " |

The temperature characteristics thereof are calculated by the capacitance at 85° C. on the basis of capacitance at 25° C. The results of these examinations are shown in the following table.

Each of the obtained samples, as shown in the table, is very fine in grain size, for example, less than 5.0 μm due to addition of zirconium oxide and has a practical dielectric constant, Q value and temperature characteristics. Further, each of these samples is a composition for ceramic dielectrics which can be sintered with zirconia setter and is optimum for such a product as a layer-built capacitor which is used in a high electric field.

What is claimed is:
1. In a composition for temperature-compensating ceramic dielectrics useful in a layer-built capacitor, comprising $La_2O_3$-$TiO_2$-CaO-MgO based composite consisting of 3.0–25.0 mol % $La_2O_3$, 51.0–62.0 mol % $TiO_2$, 0.5–45.0 mol % CaO and 1.0–45.0 mol % MgO as a main component, the improvement wherein grain size is not more than five microns, and $ZrO_2$ is present as an additive, the amount of said $ZrO_2$ being 0.1 –8.0 weight % of said main component.

* * * * *